April 29, 1958
A. V. OBERHOLTZER
2,832,473
PROCESS OF PREPARING FILTERS AND THE
FILTRATION OF LIQUIDS
Filed Dec. 3, 1952
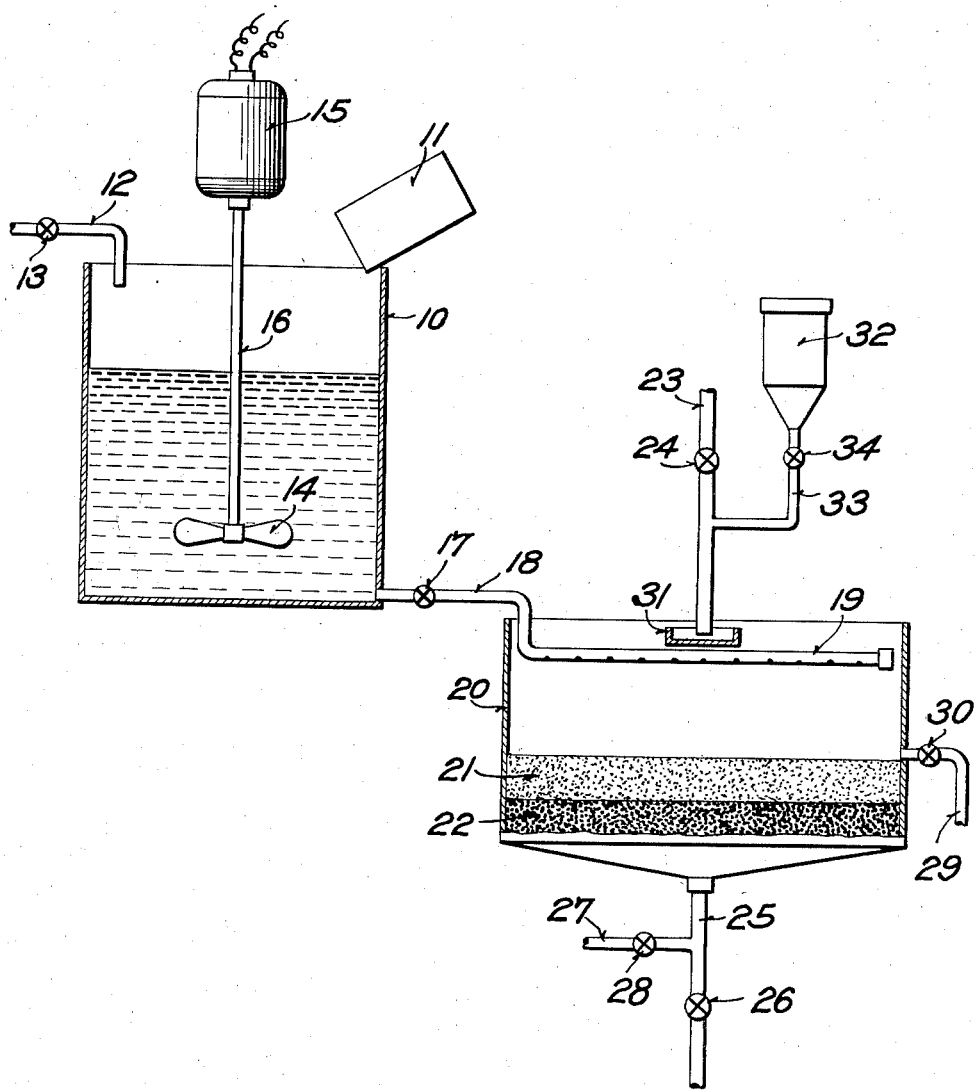
INVENTOR

United States Patent Office 2,832,473
Patented Apr. 29, 1958

2,832,473

PROCESS OF PREPARING FILTERS AND THE FILTRATION OF LIQUIDS

Alton V. Oberholtzer, St. Paul, Minn.

Application December 3, 1952, Serial No. 323,880

13 Claims. (Cl. 210—75)

This invention relates to an improved process of filtering liquids by passing them through a treated metal hydroxide filter bed. More particularly, the invention relates to a process of deflocculating flocculated metal hydroxide or chemically producing deflocculated metal hydroxide and adsorbing the deflocculated and dispersed metal hydroxide on the granular particle surfaces of a filter bed which is used to intermittently or continually filter liquids.

The use of metal hydroxide in the purification of liquids by flocculation and precipitation with subsequent decanting or filtering is known. In filtering such flocculated or precipitated masses of metal hydroxide, with entrapped impurities, the filter becomes clogged or the mass collects on the filter bed and stops or prevents normal liquid flow. In addition the methods, as heretofore known, required the necessary reaction or flocculation and precipitation of the metal hydroxide with impurities contained in the liquid.

Contrary to the known electrolytic or chemical flocculation reaction treatment, it has now been discovered that preparations of unreacted flocculated metal hydroxide can be deflocculated and passed into a filter without passing through the filter or accumulating as reacted coagulated or precipitated masses on the filter bed. Thereby, normal liquid flow intermittently or continuously through the filter is provided in a liquid purification process with elimination of the usual preflocculation or precipitation of the metal hydroxide and impurities.

Accordingly, it is an object of this invention to provide an improved process of filtration.

Another object of this invention is to provide a process of deflocculating unreacted flocculate metal hydroxide and to pass the deflocculated metal hydroxide in dispersed form into a filter bed.

Another object of this invention is to chemically prepare a metal hydroxide dispersion, pass the dispersed metal hydroxide into a filter bed to coat the granular surfaces of the particles forming the bed, clear the filter of soluble salts or contaminants, and filter a liquid through the treated bed.

Another object of this invention is to provide an improved process of filtration by intermittently or continuously passing impure liquid directly into a filter bed treated with one or more dispersions of deflocculated unreacted metal hydroxide and withdrawing filtered liquid from the filter bed.

A further object of this invention is to provide an improved process of sterilizing, clarifying and purifying water and other liquids.

Further objects and advantages will be apparent from the following description of the accompanying drawing. The drawing is used to diagrammatically illustrate the process of preparing a dispersion of deflocculated or chemically prepared metal hydroxide, passing the prepared dispersion of metal hydroxide directly into a filter bed and intermittently or continuously filtering liquid.

In order to provide a brief background of illustration relative to the well known usage of filter beds in purifying water there is incorporated by reference such filters as Bachman discloses in his Patent 739,473 or Patrick 2,069,621. Further, to illustrate the prior knowledge of forming metal hydroxide floc and coagulant metal hydroxides, there is indicated such patents as LaPorte 1,658,974 and Weymouth 2,542,743. These references represent methods of producing metal hydroxide and utilizing the old methods of flocculation, settling and filtering in contrast to the present improved method of similarly preparing bodies of clean deflocculated metal hydroxide or simultaneously dispersing the chemically produced metal hydroxide, and preparing a filter bed with the prepared dispersion or redispersion of metal hydroxide, in the manner as herein disclosed. This prepared dispersion of metal hydroxide is produced by the high speed rotation of a blender in contrast to the mild agitation for flocculation and precipitation with subsequent settling as exemplified by Weymouth in Patent 2,542,743.

There is illustrated a reaction tank or container 10, in which is prepared a deflocculated unreacted metal hydroxide dispersion or a chemically prepared metal hydroxide dispersion which is passed directly into a filter bed to coat the exposed and underlying particle surfaces throughout the bed in the manner as hereinafter described. A container 11, for example, containing a concentrate of commercially prepared unreacted flocculated metal hydroxide is tipped to pour the flocculated metal hydroxide into tank 10, and water, or other liquid, is added from conduit 12 in a measured volume by control valve 13.

In order to deflocculate and obtain a redispersion of the flocculated metal hydroxide, there is provided in tank 10 a paddle 14 which is turned at high speed by electric motor 15 through the drive shaft 16. A conventional blender, homogenizer or other type dispersing apparatus will produce the dispersion of metal hydroxide which is fed by control valve 17, through conduit 18, and a suitable header 19, into filter 20. The dispersed metal hydroxide impregnates the filter bed 21, and forms a film or coating of metal hydroxide on the surfaces of the granular particles forming the filter bed 21. Such a filter bed may be, for example, sand or other granular material with surfaces having an affinity for the dispersed metal hydroxide. Below the filter bed 21, a carbon bed 22 may be used to advantage, with some liquids, and is preferred in clarifying and purifying water.

The filter 20 is provided with a liquid inlet conduit 23, having a control valve 24, and liquid outlet 25, having a control valve 26. Connected to the conduit 25 is a by-pass conduit 27, having a control valve 28. At the side of the filter 20 a conduit 29, having control valve 30, is provided approximately at the top level of the filter bed 21 to afford an outlet for drainage purposes when the filter is to be cleaned by back flow of liquid from the conduit 25.

To illustrate a process of filtration, a batch of deflocculated and dispersed aluminum hydroxide is prepared in the container 10 and fed while in the dispersed state through conduit 18 and header 19 into the filter 20. In this case the valve 24 is closed. The metal hydroxide dispersion passes into the filter bed 21 and the metal hydroxide is adsorbed or forms tenuous coatings and films on the granular surfaces of the filter bed 21. After the coatings are provided on the surfaces of the granular particles, valve 17 is closed and a new dispersion batch is prepared or the remaining batch is maintained in dispersed form for subsequent feed into the filter bed 21. Thereafter, valve 24 is opened and impure water, or other liquid, is passed through conduit 23, past deflector 31, into filter 20 and into filter bed 21. The active metal hydroxide coatings or films react with or adsorbs impurities including minerals, salts, bacterial matter, growths, fungi and the like. Clarified and purified water, or other liquid passes from the filter 20 into outlet conduit 25. With valve 28 closed and valve 26 open the filtered water or other liquid passes to a point of usage or storage. From time to time, or at periodic intervals, valve 24 is closed and new metal hydroxide coatings are provided on the granules of the filter bed 21.

On the other hand, after preparing a dispersion from the flocculated metal hydroxide, and while passing it into the filter, in the manner as described, a continuous flow of impure liquid through control valve 24 and inlet conduit 23 provides for a metal hydroxide coating on the granular surfaces of the filter bed 21 simultaneously with the continuous filtration of liquid. In this instance an occasional inflow of dispersed metal hydroxide into the filter bed 21 provides new coatings of active metal hydroxide and permits continuous flow of purified and clarified liquid to pass from the filter through outlet conduit 25, in the manner as described.

For the purification of water by the method as herein described, there has been illustrated a process whereby a dispersion of metal hydroxide obtained from a flocculated unreacted metal hydroxide, as aluminum hydroxide, impregnates and coats a filter bed. A preferred method of obtaining a dispersed metal hydroxide is by a chemical reaction of standard practice as illustrated from the hydrolysis of aluminum salts. For example, a soluble aluminum salt as an aluminum sulfate, and a soluble alkali as sodium carbonate, reacts to produce a flocculated aluminum hydroxide in a water solution in container 10. The flocculant aluminum hydroxide is redispersed, simultaneously as formed chemically, by the high speed stirrer 14 and passed into the filter bed in the manner as described. Other chemical preparations of aluminum hydroxide as by addition of sodium aluminate to water and use of an acid or ammonium chloride to control the hydrogen ion concentration slightly above $10^{-4}$ to about $10^{-10}$ will obtain a precipitation of aluminum hydroxide which is deflocculated and dispersed, as formed, by the high speed stirrer 14. A slow agitation flocculates and precipitates the metal hydroxide. However, when redispersed as by a high speed stirrer, the metal hydroxide can be fed directly into a filter in the dispersed form, in the manner as herein described. Likewise, an iron hydroxide may be prepared by hydrolyzing the simple ferric salts, adding a base solution to a solution of a ferric salt, or reacting ammonium, sodium or potassium hydroxide with a neutral iron salt solution to precipitate an iron hydroxide which, when dispersed, can be fed into the filter bed and used to filter liquids in the manner as herein described. Further, a suitable concentrate of metal hydroxide precipitate and flocculate can be formed by boiling down a solution, for example, of aluminum acetate. The metal hydroxide is dispersed and deflocculated by the method as herein disclosed and provides a coating of aluminum hydroxide on the particle surfaces of the granular filter bed.

When utilizing a dispersion of metal hydroxide chemically prepared and without previous removal of soluble salts or contaminants present due to the reaction, it is preferred to first coat the granular surfaces of the filter bed and then remove the contaminants before purification of liquids which are filtered and used for human consumption. That is, the deflocculated and dispersed metal hydroxide solution is passed into the filter bed 21 with valve 26 closed and valve 28 open. The valve 24 may also be closed during feeding of the metal hydroxide dispersion into the filter bed or it may be opened for a controlled flow of impure liquid into the filter in conjunction with the feed of metal hydroxide. After the coating operation is completed, any soluble salts remaining in filter 20 are cleared therefrom by flushing with liquid from conduit 23, or a back-flow of filtered liquid forced through conduit 27 and drained off by conduit 29. With such back-flow, valves 24 and 26 are closed and valves 28 and 30 are open. After clearing the filter of the harmful chemical contaminants, the valves 28 and 30 are closed, and valves 24 and 26 opened for continued filtration of impure liquid, as described.

Other metal hydroxides as nickel, copper, chromium, and the like, or mixtures thereof, can be deflocculated and dispersed and used to coat the particle surfaces of the granular filter bed for filtration and removal of extraneous matters from liquid materials. The preferred concentration of the metal hydroxide dispersion fed into the filter bed by control of liquid volumes in container 10, or flow of added liquid from conduit 23 is approximately 1 gram metal hydroxide per cc. of liquid dispersant. A concentration which is too low passes metal hydroxide through the filter and is to be avoided.

It is occasionally necessary to sterilize the filter 20 and filter beds 21 and 22, if used, to prevent any build up of contaminants as bacterial life and the like which has been filtered from an impure liquid. Therefore, a container or funnel 32 is connected by conduit 33 to inlet 23 to feed a sterilizing solution into the filter 20. A valve 34 in conduit 33 controls the flow of sterilizing fluid which is passed into the filter 20 with or without liquid flow through control valve 24. During sterilization of the filter beds 21 and 22 the control valve 26 is closed and control valve 28 opened to by-pass or withdraw sterilizing fluid from the filter by way of conduit 27.

In place of sterilizing fluid, the occasional coatings of metal hydroxide may be cleaned from the filter by passing an acid or metal solvent through the conduit 33 into the filter 20, with or without dilution with liquid passing through control valve 24. The dissolved metals are likewise passed from filter 20 by closure of valve 26 and opening of valve 28. In the event an acid is used, the filtration structure must be of acid insoluble material, as an alloy or porcelain, or other suitable material. In both the sterilization and metal removal process, it is preferred to clear the filter 20 of the treating solution by flushing with additional liquid from conduit 23 and recoating the particle surfaces of the granular filter bed with a fresh solution of dispersed deflocculated metal hydroxide. Thereafter, valve 28 is closed and valve 26 opened to continue filtration of a liquid, in the manner as described.

Alternatively, the filter beds 21 and 22 may be flushed or cleaned by forcing a flushing, sterilizing, or solubilizing agent, as described, through conduit 27 in back-flow relationship to the filter and draining off the back-flow liquid by opening valve 30 to outlet drain 29. After flushing and washing, the valves 28 and 30 are closed, valve 26 is opened, and the process of recoating and filtration continued as described.

The sterilization treating material may be a chlorine solution or other sterilizing agent as phenol and the like. The acid material may be sulfuric or hydrochloric or other solubilizing agent for the respective metal hydroxide film or coating and collected substances. In either case, such agents and their relative sterilizing or metal solubilizing properties are of conventional character known in the art and adapted to the process herein disclosed.

A liquid which is sterilized, clarified and purified by filtering it through the metal hydroxide coated granular filter bed with material advantages is water, in the manner as illustrated, from artesian wells, mineral spring waters, or from city water supplies. Such water when used in the beverage industry and after treatment, in the manner as illustrated, carbonates with greater ease, retains carbonation for longer periods than water not so treated. Such purified water produces a longer life and gives better taste to the beverages. Another advantageous use is in the purification of water used in production of alcoholic beverages as beers and the like, or filtration of the alcoholic beverages after fermentation.

Also, water treated in the manner as herein described aids in kitchen use and for other cooking processes.

Further, it has been found that milk is sterilized by filtering it through coatings of aluminum hydroxide on the filter bed. The aluminum hydroxide coating appears to have an absorbent or bacterial killing action in addition to its adsorbent or absorbent property with respect to impurities in the liquid being filtered.

An additional liquid material which has created a tremendous problem is the secondary treatment of sewage liquid after preliminary removal of the roughage. Preparation of the filter bed, in the manner as described, and flow of such sewage water therethrough with occasional periodic recoating of the filter bed with fresh active dispersed metal hydroxide will provide a process of clarifying the liquid so that it may be disposed of in normal water channels.

Having thus described my invention in deflocculating flocculated and precipitated metal hydroxide, and providing for active coatings on the granular surfaces of a filter bed with the dispersed metal hydroxide, it will be apparent that many liquids containing impurities, either reactive or non-reactive may be filtered therethrough.

What I claim is:

1. The method of preparing the granular surfaces of a filter bed with a reactant coating of metal hydroxide and filtering aqueous liquids therethrough comprising the steps of dispersing chemically precipitated and bulky flocculated metal hydroxide selected from the group consisting of aluminum, iron, copper and nickel hydroxide and mixtures thereof, passing the metal hydroxide in dispersed form into a granular filter bed, coating the individual granular particle surface throughout the filter bed with the metal hydroxide from the dispersion thereof, passing an impure aqueous liquid into the filter bed and over the reactant coatings throughout the filter bed, and withdrawing filtered liquid from the filter.

2. The method of filtering an impure liquid comprising the steps of deflocculating a flocculated bulky body of metal hydroxide selected from the group consisting of aluminum, iron, copper and nickel hydroxide and mixtures thereof, periodically feeding the deflocculated metal hydroxide in dispersed form into a granular filter bed, forming reactant coatings from the dispersion of metal hydroxide on the grannular surface throughout the filter bed, passing a filtrable impure liquid into the filter bed, and withdrawing filtered liquid from the filter bed.

3. The method of filtering an impure liquid comprising the steps of preparing an aqueous liquid dispersion of chemically produced granular adhering metal hydroxide, feeding the dispersion of metal hydroxide into a filter bed of granular particles, forming reactant coatings from the metal hydroxide in its dispersed form on the surface of the granular particles throughout the filter bed, flushing the filter bed to free it from the dispersant liquid, thereafter passing impure liquid into the metal hydroxide coated filter bed, and withdrawing filtered liquid from the filter bed.

4. The method of preparing the exposed and underlying granular particle surfaces of a filter bed with an adherent coating of impurity adsorbent and absorbent metal hydroxide in dispersed form comprising the steps forming and dispersing chemically precipitated metal hydroxide selected from the group consisting of aluminum, iron, copper and nickel hydroxide and mixtures thereof, in an aqueous liquid batch, passing the dispersed metal hydroxide into a filter bed formed of granular particles, forming reactant coatings of adsorbent and absorbent metal hydroxide on the surfaces of the granular particles throughout the filter bed, flushing the liquid portion of the dsipersion from the filter bed, and maintaining the said metal hydroxide in its adsorbent and absorbent state as a coating on the particle surfaces of the filter bed for the filtration of liquids therethrough.

5. The method of repeatedly preparing the exposed and underlying granular surface throughout a filter bed with reactant coatings of dispersed metal hydroxide selected from the group consisting of unreacted chemically prepared aluminum, iron, copper and nickel hydroxides and mixtures thereof comprising the steps of forming an aqueous dispersion of the chemically prepared metal hydroxide, intermittently feeding the dispersion of deflocculated metal hydroxide into a filter bed of granular particles, and coating the surfaces of the granular particles throughout the filter bed with a reactant coating of metal hydroxide with each intermittent feeding of metal hydroxide.

6. The method of claim 5 including the step of flushing the filter bed after each intermittent coating of metal hydroxide particles is formed on the surfaces of the granular particles throughout the filter bed.

7. The method of claim 5, including the intermittent flow of a filtrable impure liquid into the filter bed and the withdrawal of filtered liquid from the filter bed after each intermittent coating of metal hydroxide on the surfaces of the granular particles throughout the filter bed.

8. The process of claim 5, including the step of continuously flowing a filtrable impure liquid into the filter bed and withdrawing filtered liquid from the filter bed during intermittent feeding of dispersed deflocculated metal hydroxide precipitate into the filter bed.

9. The method of preparing exposed and underlying particle surfaces throughout a granular filter bed with an adherent coating of reactant metal hydroxide comprising the steps of forming a chemical precipitate of metal hydroxide selected from the group consisting of aluminum, iron, copper and nickel hydroxide and mixtures thereof, simultaneously forming an aqueous dispersion of the metal hydroxide and thereafter periodically coating the particle surfaces throughout the granular filter bed with the dispersed reactant metal hydroxide.

10. In the method of claim 9, the added step of flushing the metal hydroxide coating free of chemical contaminants.

11. In the method of claim 9, the added step of filtering a filtrable liquid through the metal hydroxide coated filter bed.

12. The method of preparing adhering reactant metal hydroxide coatings for adsorption and absorption of impurities therewith on the exposed and underlying particle surfaces throughout a granular filter bed by using a concentrated dispersion of metal hydroxide obtained from a prepared flocculated and precipitated metal hydroxide selected from the group consisting of aluminum, iron, copper and nickel hydroxide and mixtures thereof, comprising the steps of forming an aqueous liquid dispersion from concentrated flocculated and precipitated metal hydroxide in the concentration of about 1 gram metal hydroxide to 1 cc. of liquid and coating the particle surfaces throughout a filter bed with the metal hydroxide contained in the formed dispersion.

13. In the method of claim 12, the step of immediately filtering a filtrable liquid through the prepared granular filter bed while the coatings on the particulate surfaces are fresh and reactant.

References Cited in the file of this patent

UNITED STATES PATENTS

| 337,026 | Smith | Mar. 2, 1886 |
| 726,304 | Jewell et al. | Apr. 28, 1903 |
| 739,473 | Bachman | Sept. 22, 1903 |
| 1,526,465 | Dixon | Feb. 17, 1925 |
| 2,043,705 | Meinzer | June 9, 1936 |
| 2,069,621 | Patrick | Feb. 2, 1937 |
| 2,108,168 | Jenks | Feb. 15, 1938 |
| 2,196,908 | Bachman | Apr. 9, 1940 |
| 2,267,831 | Liebknecht et al. | Dec. 30, 1941 |
| 2,287,486 | Reichelt et al. | June 23, 1942 |
| 2,355,808 | Lawlor | Aug. 15, 1944 |
| 2,426,020 | Hauck | Aug. 19, 1947 |

FOREIGN PATENTS

| 11,922 | Great Britain | of 1915 |

OTHER REFERENCES

Clark, J.: New England Water Works Assn., vol. 36, 1922, pp. 385–91.